(12) United States Patent
Serrao et al.

(10) Patent No.: US 11,987,305 B2
(45) Date of Patent: May 21, 2024

(54) BOGIE AXLE ASSEMBLY FOR A VEHICLE

(71) Applicant: Dana Italia S.R.L., Arco (IT)

(72) Inventors: Lorenzo Serrao, Torbole (IT); Giulio Ornella, Arco (IT); Nick Jeroen Josef Muylle, Ghent (BE)

(73) Assignee: DANA ITALIA S.R.L., Arco (IT)

( * ) Notice: Subject to any disclaimer, the term of this patent is extended or adjusted under 35 U.S.C. 154(b) by 959 days.

(21) Appl. No.: 16/967,701

(22) PCT Filed: Jan. 31, 2019

(86) PCT No.: PCT/EP2019/052424
§ 371 (c)(1),
(2) Date: Aug. 5, 2020

(87) PCT Pub. No.: WO2019/154716
PCT Pub. Date: Aug. 15, 2019

(65) Prior Publication Data
US 2021/0031846 A1    Feb. 4, 2021

(30) Foreign Application Priority Data

Feb. 6, 2018   (EP) ..................................... 18425004

(51) Int. Cl.
*B60G 5/04*      (2006.01)
*B62D 55/112*    (2006.01)
(Continued)

(52) U.S. Cl.
CPC ............ *B62D 61/10* (2013.01); *B62D 55/112* (2013.01); *B60G 2300/32* (2013.01); *B62D 55/0655* (2013.01)

(58) Field of Classification Search
CPC .. B62D 61/10; B62D 55/112; B62D 55/0655; B62D 55/104; B60G 2300/32; B60G 5/04; B60G 5/06
See application file for complete search history.

(56) References Cited

U.S. PATENT DOCUMENTS 2,779,636 A    1/1957  Allen
3,262,522 A *  7/1966  Johnson ................. B60G 17/06
                                                  180/9.1
(Continued)

FOREIGN PATENT DOCUMENTS

EP    2729351 B1   5/2016
WO    0149556 A1   7/2001

OTHER PUBLICATIONS

SA European Patent Office, International Search Report Issued in Application No. PCT/EP2019/052424, dated Apr. 26, 2019, WIPO, 3 pages.

*Primary Examiner* — James A English
(74) *Attorney, Agent, or Firm* — McCoy Russell LLP

(57) ABSTRACT

A bogie axle assembly for a vehicle, in particular for an off-highway vehicle such as a forestry machine, the bogie axle assembly comprising: a rigid link arm; a first joint disposed on the link arm for pivotally coupling the link arm to a vehicle frame; a second joint disposed on the link arm, at a distance from the first joint; a bogie pivotally coupled to the link arm via the second joint; and a ground engaging structure comprising one or more wheels rotatably mounted on the bogie. The present disclosure further relates to a vehicle comprising said bogie axle assembly.

18 Claims, 5 Drawing Sheets

(51) Int. Cl.
*B62D 61/10* (2006.01)
*B62D 55/065* (2006.01)

(56) References Cited

U.S. PATENT DOCUMENTS

| | | | |
|---|---|---|---|
| 4,445,582 A | 5/1984 | Andersson | |
| 5,999,868 A * | 12/1999 | Beno | B60G 17/0165 |
| | | | 280/5.514 |
| 6,220,377 B1 | 4/2001 | Lansberry | |
| 2004/0099451 A1* | 5/2004 | Nagorcka | B62D 55/084 |
| | | | 180/9.5 |
| 2011/0036650 A1* | 2/2011 | Simula | B62D 55/065 |
| | | | 280/6.15 |
| 2016/0236733 A1* | 8/2016 | Tiede | B62D 55/104 |
| 2019/0233033 A1* | 8/2019 | Harnetiaux | B62D 11/003 |

* cited by examiner

BOGIE AXLE ASSEMBLY FOR A VEHICLE

CROSS-REFERENCE TO RELATED APPLICATION(S)

The present application is a U.S. National Phase of International Patent Application Serial No. PCT/EP2019/052424, entitled "BOGIE AXLE ASSEMBLY FOR A VEHICLE," filed on Jan. 31, 2019. International Patent Application Serial No. PCT/EP2019/052424 claims priority to European Patent Application No. 18425004.1, filed on Feb. 6, 2018. The entire contents of each of the above-mentioned applications are hereby incorporated by reference in their entirety for all purposes.

TECHNICAL FIELD

The present disclosure relates to a bogie axle assembly for a vehicle, in particular for an off-highway vehicle such as a forestry machine. The present disclosure further relates to a vehicle comprising said bogie axle assembly, in particular to an off-highway vehicle such as a forestry machine.

BACKGROUND AND SUMMARY

Work machines designed for use in rough terrain such as forestry machines are typically equipped with a tandem axle mounted on a vehicle frame. Such a tandem axle usually includes a first bogie and a second bogie disposed on opposing lateral sides of the vehicle frame with a ground engaging structure comprising a plurality of wheels or a track system mounted on each bogie. In order to minimize movement of the vehicle frame as the vehicle travels over rough terrain such as a forest floor, the first and the second bogie may be configured to independently pivot or swivel with respect to a common swivel axis of the tandem axle.

However, there is demand for a bogie axle assembly providing improved drivability even in rough terrain.

This object is solved by a bogie axle assembly according to the present disclosure and by a vehicle including said bogie axle assembly. Special embodiments are described in the dependent claims.

The presently proposed bogie axle assembly for a vehicle, in particular for an off-highway vehicle such as a forestry machine, comprises:
  a rigid link arm;
  a first joint disposed on the link arm for pivotally coupling the link arm to a vehicle frame;
  a second joint disposed on the link arm, at a distance from the first joint;
  a bogie pivotally coupled to the link arm via the second joint; and
  a ground engaging structure comprising at least one, at least two or a plurality of wheels or wheel hubs rotatably mounted on the bogie.

The presently proposed bogie axle assembly allows coupling the bogie to a vehicle frame via two joints disposed on a rigid link arm and at a distance from one another. Due to the two degrees of freedom of movement of the bogie provided by the two joints relative to a vehicle frame to which the bogie may be coupled, the presently proposed bogie axle assembly is particularly well suited for adjusting a position of the bogie relative to a vehicle frame in rough terrain such as a forest floor.

The vehicle frame mentioned in the present disclosure is explicitly not a part of the bogie axle assembly in some embodiments. However, in special embodiments the vehicle frame may be part of the presently disclosed bogie axle assembly. The link arm and the bogie may be made of or may comprise a metallic material such as steel or the like. However, it is understood that the link arm and the bogie may be made of other suitable materials. The ground engaging structure may further include a track or crawler chain, for example.

The first joint may be configured as a first swivel joint defining a first swivel axis. The first joint may be configured such that a swivelling movement of the link arm with respect to the first swivel axis or relative to a vehicle frame to which the link arm may be coupled via the first joint, is restricted to a plane arranged perpendicular to the first swivel axis. Usually, this includes that as the link arm swivels with respect to the first swivel axis or relative to the vehicle frame, each part or partial volume of the link arm is restricted to move on a circle defining a plane perpendicular to the first swivel axis and having the first swivel axis at its center. Similarly, the second joint may be configured as a second swivel joint defining a second swivel axis. That is, the second joint may be configured such that a swivelling movement of the bogie relative to the link arm is restricted to a plane arranged perpendicular to the second swivel axis. Usually, this includes that as the bogie swivels with respect to the second swivel axis or relative to the link arm, each part or partial volume of the bogie is restricted to move on a circle defining a plane perpendicular to the second swivel axis and having the second swivel axis at its center.

Typically, the second swivel axis is disposed at a distance from the first swivel axis. Usually the first swivel axis and the second swivel axis are disposed at a fixed distance from one another. The first joint and the second joint may be configured such that the first swivel axis and the second swivel axis are arranged in parallel. The first joint and the second joint may be disposed on opposing sides of the link arm along a direction arranged in parallel to the first swivel axis and/or to the second swivel axis.

The bogie axle assembly may further comprise at least one of or both of: a first swivel control device for dampening or for actively controlling a swivelling movement of the link arm with respect to the first swivel axis defined by the first joint or relative to a vehicle frame to which the link arm may be coupled via the first joint, and a second swivel control device for dampening or for actively controlling a swivelling movement of the bogie relative to the link arm. The first swivel control device may be pivotally coupled to the link arm via a first link arm pivot point disposed on the link arm at a distance from the first swivel axis. Usually, the first link arm pivot point is disposed on the link arm between the first joint and the second joint.

Additionally, the first swivel control device may be configured to be pivotally coupled to a vehicle frame. Similarly, the second swivel control device may be pivotally coupled to the link arm via a second link arm pivot point disposed on the link arm at a distance from the second swivel axis. Additionally, the second swivel control device may be pivotally coupled to the bogie at a bogie pivot point disposed at a distance from the second swivel axis.

For example, the first swivel control device may comprise at least one of: at least one first mechanical spring, at least one first hydraulic cylinder, and at least one first pneumatic cylinder. To control a swivelling movement of the link arm, an extension of a piston of the first hydraulic/pneumatic cylinder may be controllable by varying an amount of fluid and/or a fluid pressure within the first hydraulic/pneumatic cylinder.

Additionally or alternatively, the first swivel control device may comprise a first rotary actuator. For example, the first rotary actuator may include a first hydraulic rotary actuator, a first pneumatic rotary actuator, or a first electromagnetic rotary actuator which may include an electric motor. The aforementioned first hydraulic/pneumatic rotary actuator typically comprises at least a first portion, a second portion pivotally mounted on the first portion, and at least one actuation chamber formed between the first and the second portion. The at least one actuation chamber is then usually configured to be pressurized and/or depressurized for swivelling the second portion relative to the first portion by controlling an amount of fluid and/or a fluid pressure in the at least one actuation chamber. The fluid may include a liquid such as oil or air, for example. A swivel axis of the first rotary actuator may be aligned with the first swivel axis defined by the first joint. Usually, one of the first portion and the second portion of the first rotary actuator is mounted on the link arm. The other of the first portion and the second portion of the first rotary actuator may then be mounted on a vehicle frame, for example.

Similarly, the second swivel control device may comprise at least one of: at least one second mechanical spring, at least one second hydraulic cylinder, and at least one second pneumatic cylinder. To control a swivelling movement of the link arm, an extension of a piston of the second hydraulic/pneumatic cylinder may be controllable by varying an amount of fluid and/or a fluid pressure within the second hydraulic/pneumatic cylinder.

Additionally or alternatively, the second swivel control device may comprise a second rotary actuator. For example, the second rotary actuator may include a second hydraulic rotary actuator, a second pneumatic rotary actuator, or a second electromagnetic rotary actuator which may include an electric motor. The aforementioned second hydraulic/pneumatic rotary actuator typically comprises at least a first portion, a second portion pivotally mounted on the first portion, and at least one actuation chamber formed between the first and the second portion. The at least one actuation chamber is then usually configured to be pressurized and/or depressurized for swivelling the second portion relative to the first portion by controlling an amount of fluid and/or a fluid pressure in the at least one actuation chamber. Again, the fluid may include a liquid such as oil or air, for example. A swivel axis of the second rotary actuator may be aligned with the second swivel axis defined by the second joint. Usually, one of the first portion and the second portion of the second rotary actuator is mounted on the link arm, and the other of the first portion and the second portion of the second rotary actuator is mounted on the bogie.

For controlling the first hydraulic/pneumatic cylinder and/or the second hydraulic/pneumatic cylinder and/or the first hydraulic/pneumatic rotary actuator and/or the second hydraulic/pneumatic rotary actuator, the bogie axle assembly may further comprise a fluid pump and/or at least one of a hydraulic accumulator and a pneumatic accumulator. The fluid pump and/or the accumulator may then be selectively fluidly connected with the first hydraulic/pneumatic cylinder and/or the second hydraulic/pneumatic cylinder and/or the first hydraulic/pneumatic rotary actuator and/or the second hydraulic/pneumatic rotary actuator, for example via one or more control valves.

The bogie axle assembly may further comprise a vehicle frame. In other words, in some embodiments the vehicle frame may be a part of the presently disclosed bogie axle assembly. The link arm is then typically pivotally coupled to the vehicle frame via the first joint. Typically, the first swivel axis defined by the first joint then has a fixed orientation with respect to the vehicle frame. Along a direction defined by the first swivel axis, the link arm may be disposed between the vehicle frame and the bogie, for example. Or in other words, along the direction defined by the first swivel axis, the bogie and the vehicle frame may be disposed on opposing sides of the link arm.

The bogie axle assembly may further comprise a rotary motor mounted on one of the link arm and the bogie and drivingly engaged with the one or more wheels or wheel hubs mounted on the bogie. For example, the rotary motor may comprises at least one of an electric motor and a hydraulic motor, in particular a hydraulic motor having a variable hydraulic displacement. For instance, when the rotary motor for driving the wheels comprises a hydraulic motor, the hydraulic motor may include an axial hydrostatic piston motor, a radial hydrostatic piston motor, or any other type of variable displacement hydraulic or hydrostatic motor known in the art.

Furthermore, when the rotary motor for driving the wheels or wheel hubs comprises a hydraulic motor, the bogie assembly typically also comprises a hydraulic pump in fluid communication with the hydraulic motor for driving the hydraulic motor. For example, the hydraulic pump may be in driving engagement or in selective driving engagement with an engine such as an internal combustion engine or an electric engine. In this case, the hydraulic circuit comprising the hydraulic pump and the hydraulic motor in fluid communication with the hydraulic pump form a hydraulic or hydrostatic transmission configured to transmit torque between the engine and the ground engaging structure. Varying the hydraulic displacement of the hydrostatic motor may then vary an effective gear ratio provided by the hydraulic or hydrostatic transmission comprising the hydraulic pump and the hydraulic motor.

The bogie axle assembly may further comprise at least one of a gyrometer and an accelerometer configured to be mounted on a vehicle frame and configured to measure an attitude of the gyrometer/accelerometer and/or of the vehicle frame on which it may be mounted relative to the horizon. The attitude may comprise at least one of a roll angle and a pitch angle of the gyrometer/accelerometer or of the vehicle frame on which it may be mounted relative to the horizon. And the bogie axle assembly may further comprise an electronic control unit (ECU) in communication with the gyrometer/accelerometer and with at least one of or both of the first swivel control device and the second swivel control device. The ECU may then be configured or programmed to control at least one of or both of the first swivel control device and the second swivel control device based on the measured attitude of the gyrometer/accelerometer and/or of the vehicle frame.

For example, the ECU may be configured or programmed to actuate the first swivel control device to control a first swivel angle of the link arm relative to the vehicle frame to which the link arm may be coupled, for instance based on or based at least on the attitude measured by the gyrometer/accelerometer. And additionally or alternatively, the ECU may be configured or programmed to actuate the second swivel control device to control a second swivel angle of the bogie relative to the link arm, for instance based on or based at least on the attitude measured by the gyrometer/accelerometer. In this way, the ECU may be configured or programmed to control the attitude of the vehicle frame by actuating the first and/or the second swivel control device. For example, the ECU may be configured or programmed to actuate the first and/or the second swivel control device to selectively either one of lift and lower the vehicle frame with respect to the bogie.

The presently proposed vehicle, in particular an off-highway vehicle such as a forestry machine, comprises:
- a vehicle frame;
- a first bogie axle assembly, comprising:
  - a first rigid link arm;
  - a first joint disposed on the first link arm, the first joint pivotally coupling the first link arm to the vehicle frame;
  - a second joint disposed on the first link arm, at a distance from the first joint;
  - a first bogie pivotally coupled to the first link arm via the second joint; and
  - a first ground engaging structure comprising one or more wheels rotatably mounted on the first bogie; and
- a second bogie axle assembly, comprising:
  - a second rigid link arm;
  - a third joint disposed on the second link arm, the third joint pivotally coupling the second link arm to the vehicle frame;
  - a fourth joint disposed on the second link arm, at a distance from the third joint;
  - a second bogie pivotally coupled to the second link arm via the fourth joint; and
  - a second ground engaging structure comprising one or more wheels rotatably mounted on the second bogie.

Typically, the first and the second bogie assembly are disposed on opposing lateral sides of the vehicle frame, for example on a front left side and on a front right side of the vehicle frame or on a rear left side and on a rear right side of the vehicle frame. At least one of or each of the first and the second bogie axle assembly of the presently proposed vehicle may be configured according to one of the embodiments of the above-described bogie axle assembly.

For example, the first bogie axle assembly of the vehicle may further comprise at least one of or both of:
- a first swivel control device for dampening or for actively controlling a swivelling movement of the first link arm relative to the vehicle frame, and
- a second swivel control device for dampening or for actively controlling a swivelling movement of the first bogie relative to the first link arm.

And similarly, the second bogie axle assembly of the vehicle may further comprise at least one of or both of:
- a third swivel control device for dampening or for actively controlling a swivelling movement of the second link arm relative to the vehicle frame, and
- a fourth swivel control device for dampening or for actively controlling a swivelling movement of the second bogie relative to the second link arm.

The third and the fourth swivel control device may be configured in the same way as the above-described first and the second swivel control device.

In particular, each of the first and the second bogie axle assembly of the vehicle may be equipped with a separate rotary motor as defined above, for example with a first rotary motor mounted on one of the first link arm and the first bogie and in driving engagement with the wheels mounted on the first bogie, and with a second rotary motor mounted on one of the second link arm and the second bogie and in driving engagement with the wheels mounted on the second bogie. If the first and the second rotary motor comprise a first hydraulic rotary motor and a second hydraulic rotary motor, respectively, the vehicle may further comprise a hydraulic pump in fluid communication with both the first and the second hydraulic motor for driving the first and the second hydraulic motor, for example.

Also, the vehicle may comprise the above-mentioned gyrometer and/or accelerometer mounted on the vehicle frame and configured to measure an attitude of the vehicle frame relative to the horizon, the attitude comprising at least one of a roll angle and a pitch angle of the vehicle frame relative to the horizon. And the vehicle may comprise the above-mentioned electronic control unit (ECU) in communication with the gyrometer/accelerometer and with at least one of or all of the first, second, third and fourth swivel control device. The vehicle ECU may then be configured or programmed to control at least one of or all of the first, second, third and fourth swivel control device based on or based at least on an attitude measured by the gyrometer/accelerometer mounted on the vehicle frame. For example, the vehicle ECU may be configured or programmed to control and/or actuate the first, second, third and fourth swivel control device such as to keep the vehicle frame in a predefined attitude with respect to the horizon as the vehicle travels over an uneven surface, for example over a surface featuring knolls and depressions typically found on a forest floor.

BRIEF DESCRIPTION OF THE FIGURES

Special embodiments of the presently disclosed bogie axle assembly and of the presently disclosed vehicle are described in the following detailed description and in the accompanying drawing in which.

DETAILED DESCRIPTION

Figure 1:
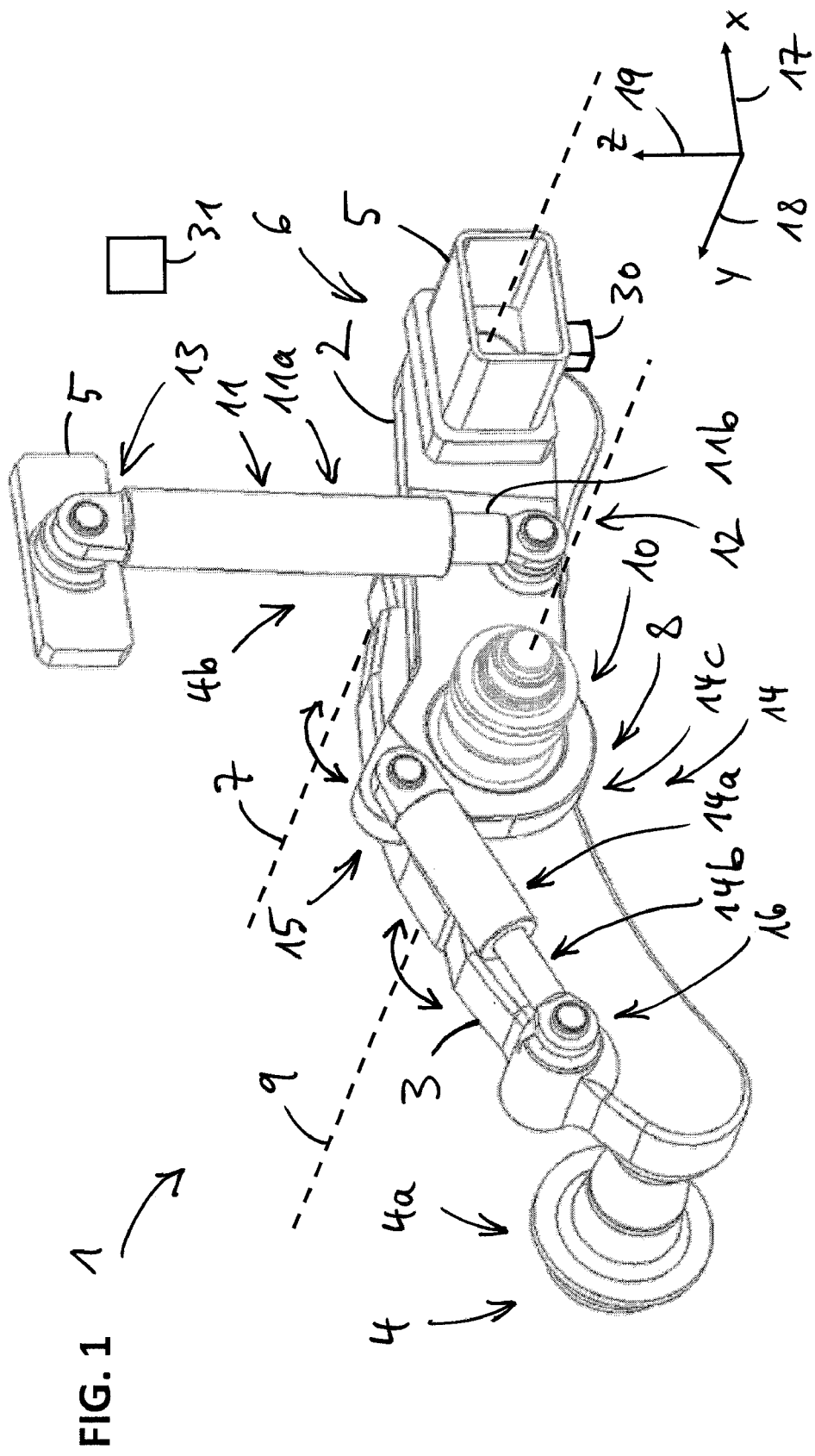
FIG. 1 shows a perspective view of an embodiment of a bogie axle assembly in accordance with the invention.

FIG. 1 shows a perspective view of an embodiment of a bogie axle assembly 1 of the presently disclosed type. The bogie assembly 1 is configured for use in an off-highway vehicle such as a forestry machine. However, it is understood that the assembly 1 may likewise be used in other off-highway vehicles such as tractors, crawlers, excavators, dumpers or the like. The assembly 1 comprises a rigid link arm 2 and a bogie 3. The link arm 2 and the bogie 3 are elongate members made of metal, for example. The assembly 1 further includes a ground engaging structure 4 comprising a first wheel hub 4a and a second wheel hub 4b (hidden from view) rotatably mounted on the bogie 3. It is understood that in other embodiments the ground engaging structure 4 may include more than two wheel hubs. The ground engaging structure 4 may further include wheels mounted on each wheel hub and/or a track system or crawler chain.

In the embodiment depicted in FIG. 1 the assembly 1 further comprises a rigid vehicle frame 5. However, it is understood that other embodiments of the assembly 1 may not include a vehicle frame. The vehicle frame 5 is a rigid structure made of a metallic material such as steel, for example. The link arm 2 is pivotally coupled to the vehicle frame 5 via a first joint 6. The first joint 6 is a swivel joint mounted or at least partially mounted on the link arm 2 and defining a first swivel axis 7. The first swivel axis 7 has a fixed orientation relative to the vehicle frame 5. The first joint 6 allows the link arm 2 to swivel or pivot relative to the vehicle frame 5 and with respect to the first swivel axis 7. The first joint 6 is configured such that it restricts a swivelling movement of the link arm 2 relative to the vehicle frame 5 to a plane arranged perpendicular to the first swivel axis 7, in parallel to an x-z-plane defined by a right hand Cartesian coordinate system defining x-, y- and −z-axes 17, 18, 19, respectively. In other words, as the link arm 2 swivels relative to the vehicle frame 5, each part or partial volume of the link arm 2 moves on a circle defining a plane perpendicular to the first swivel axis 7 and having the first swivel axis 7 at its center.

The bogie 3 is pivotally coupled to the link arm 2 via a second joint 8. The second joint 8 is a swivel joint mounted or at least partially mounted on the link arm 2 and defining a second swivel axis 9. The joints 6, 8 are configured such that the first swivel axis 7 and the second swivel axis 9 are arranged in parallel. The first joint 6 and the second joint 8 are disposed at a fixed non-zero distance from one another. Consequently, the first swivel axes 7, 9 defined by the joints 6, 8 are likewise disposed at a fixed non-zero distance from one another. Along a direction defined by the first swivel axis 7 and the second swivel axis 9, the first joint 6 and the second joint 8 are disposed on opposing sides of the link arm 2. Or in other words, along the direction defined by the first swivel axis 7 and the second swivel axis 9, the link arm 2 is disposed between the vehicle frame 5 and the bogie 3. The second joint 8 allows the bogie 3 to swivel or pivot relative to the link arm 2 and with respect to the second swivel axis 9. The second joint 8 is configured such that it restricts a swivelling movement of the bogie 3 relative to the link arm 2 to a plane arranged perpendicular to the second swivel axis 9. In other words, as the bogie 3 swivels relative to the link arm 2, each part or partial volume of the bogie 3 moves on a circle defining a plane perpendicular to the second swivel axis 9 and having the second swivel axis 9 at its center.

The assembly 1 further comprises a rotary motor 10. In the embodiment shown in FIG. 1 the rotary motor 10 is mounted on the link arm 2. In other embodiments of the assembly 1 not explicitly depicted here, the rotary motor 10 may likewise be mounted on the bogie 3. An output shaft (not shown) of the rotary motor 10 is drivingly engaged with the wheel hubs 4a, 4b or with the wheels mounted on the wheel hubs 4a, 4b. That is, the rotary motor 10 is configured to drive a set of wheels or a crawler chain mounted on the wheel hubs 4a, 4b. For transmitting torque from the output shaft of the rotary motor 10 to the wheel hubs 4a, 4b a plurality of gears or one or more kinematic chains may be housed within the bogie 3.

The rotary motor 10 may be an electric motor or a hydraulic motor, for example a variable displacement hydrostatic motor such as a radial piston motor or an axial piston motor. When the rotary motor 10 is configured as a hydraulic rotary motor, the assembly 1 typically further comprises a hydraulic pump in fluid communication with the hydraulic rotary motor for transmitting torque between the hydraulic pump and the hydraulic rotary motor, the hydraulic pump and the hydraulic rotary motor thereby forming a hydrostatic transmission. Usually, the hydraulic pump is drivingly engaged or selectively drivingly engaged with a vehicle engine such as an electric engine or an internal combustion engine.

The assembly 1 further comprises a first swivel control device 11 for controlling the swivelling movement of the link arm 2 with respect to the first swivel axis 7, in particular for controlling the swivelling movement of the link arm 2 relative to the vehicle frame 5. In the embodiment depicted in FIG. 1, the first swivel control device 11 comprises an actively controllable first hydraulic cylinder 11a. In other words, an extension of a hydraulic piston 11b of the first hydraulic cylinder 11a may be varied by varying an amount of fluid and/or a fluid pressure inside the first hydraulic cylinder 11a of the first swivel control device 11, for example in order to lower or to lift the link arm 2 relative to the vehicle frame 5. The fluid may include a liquid such as oil, for example. For instance, the first hydraulic cylinder 11a may be in fluid communication or in selective fluid communication with a hydraulic control circuit. The hydraulic control circuit may include a pressure source such as a fluid pump and a fluid tank and/or a hydraulic accumulator, for example. A first end of the first hydraulic cylinder 11a is pivotally coupled to the link arm 2 at a first link arm pivot point 12 disposed on the link arm 2 at a non-zero distance from the first swivel axis 7. And a second end of the first hydraulic cylinder 11a is pivotally coupled to the vehicle frame 5 at a vehicle frame pivot point 13 disposed on the vehicle frame 5 at a distance from the first swivel axis 7. In other embodiments of the assembly 1, a suspension cylinder including a mechanical spring, a pneumatic cylinder or an electric actuator may replace the first hydraulic cylinder 11a, for example.

The assembly 1 further comprises a second swivel control device 14 for controlling the swivelling movement of the bogie 3 with respect to the second swivel axis 9, in particular for controlling the swivelling movement of the bogie 3 relative to the link arm 2. In the embodiment depicted in FIG. 1, the second swivel control device 14 comprises an actively controllable second hydraulic cylinder 14a. In other words, an extension of a hydraulic piston 14b of the second hydraulic cylinder 14a may be varied by varying an amount of fluid and/or a fluid pressure inside the second hydraulic cylinder 14a of the second swivel control device 14, for example in order to tilt the bogie 3 relative to the link arm 2. Again, the fluid may include a liquid such as oil, for example. For instance, the second hydraulic cylinder 14a may be in fluid communication or in selective fluid communication with the aforementioned hydraulic control circuit. A first end of the second hydraulic cylinder 14a is pivotally coupled to the link arm 2 at a second link arm pivot point 15 disposed on the link arm 2 at a non-zero distance from the second swivel axis 9. And a second end of the second hydraulic cylinder 14a is pivotally coupled to the bogie 3 at a bogie pivot point 16 disposed on the bogie 3 at a non-zero distance from the second swivel axis 9. In other embodiments of the assembly 1, a suspension cylinder including a mechanical spring, a pneumatic cylinder or an electric actuator may replace the second hydraulic cylinder 14a, for example.

In addition or as an alternative to the second hydraulic cylinder 14a, the second swivel control device 14 may comprise a rotary actuator for actively tilting the bogie 3 relative to the link arm 2. In FIG. 1 the rotary actuator of the second swivel control device 14 is indicated at 14c. The axis of rotation of this rotary actuator 14c of the second swivel control device 14 is aligned with the second swivel axis 9. The rotary actuator 14c may include or may be configured as an electric motor or an electric actuator, for example. In other embodiments, the rotary actuator 14c may include or may be configured as a hydraulic rotary actuator.

Figure 2A:
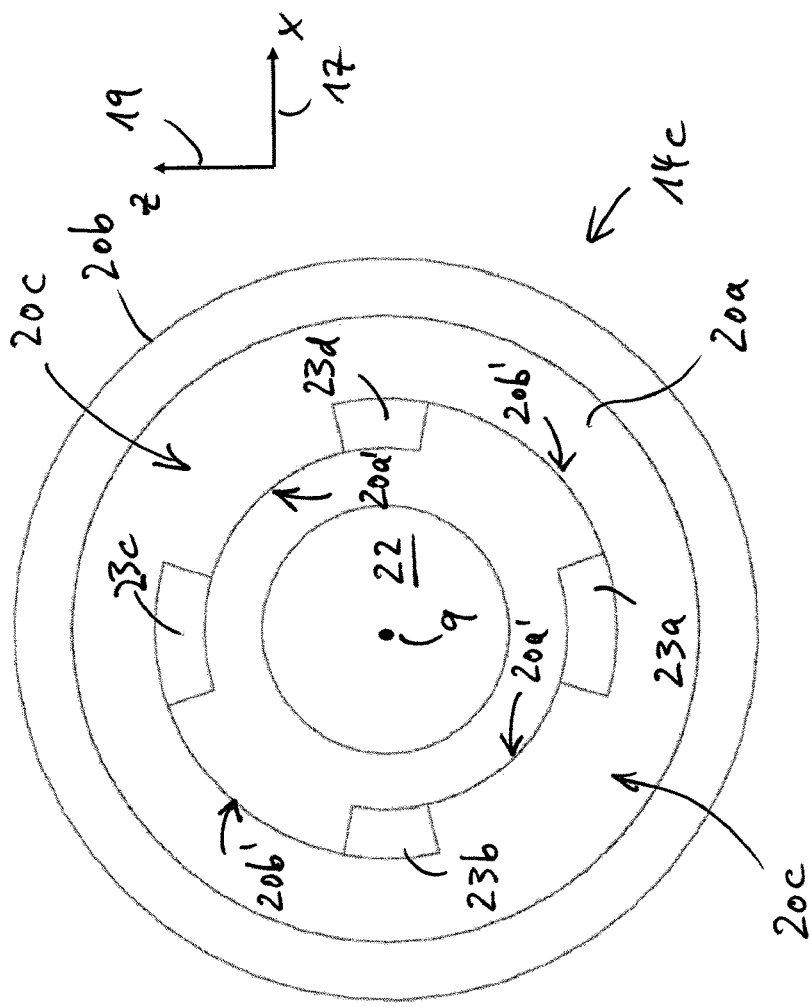
FIG. 2A shows a first sectional view of an embodiment of a rotary actuator of the bogie axle assembly of FIG. 1.
Figure 2B:
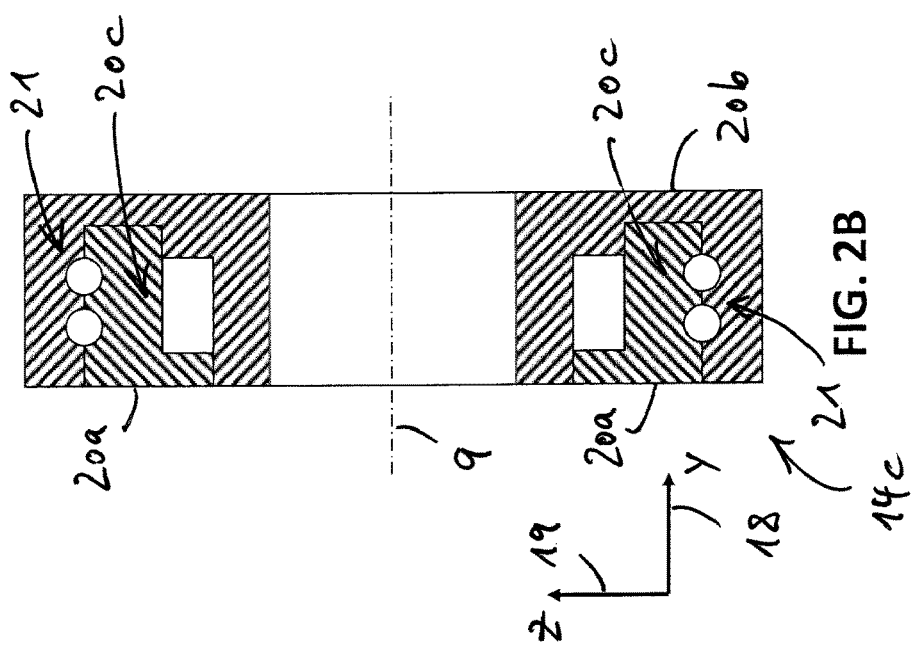
FIG. 2B shows a second sectional view of the rotary actuator of FIG. 2A.
Figure 2C:
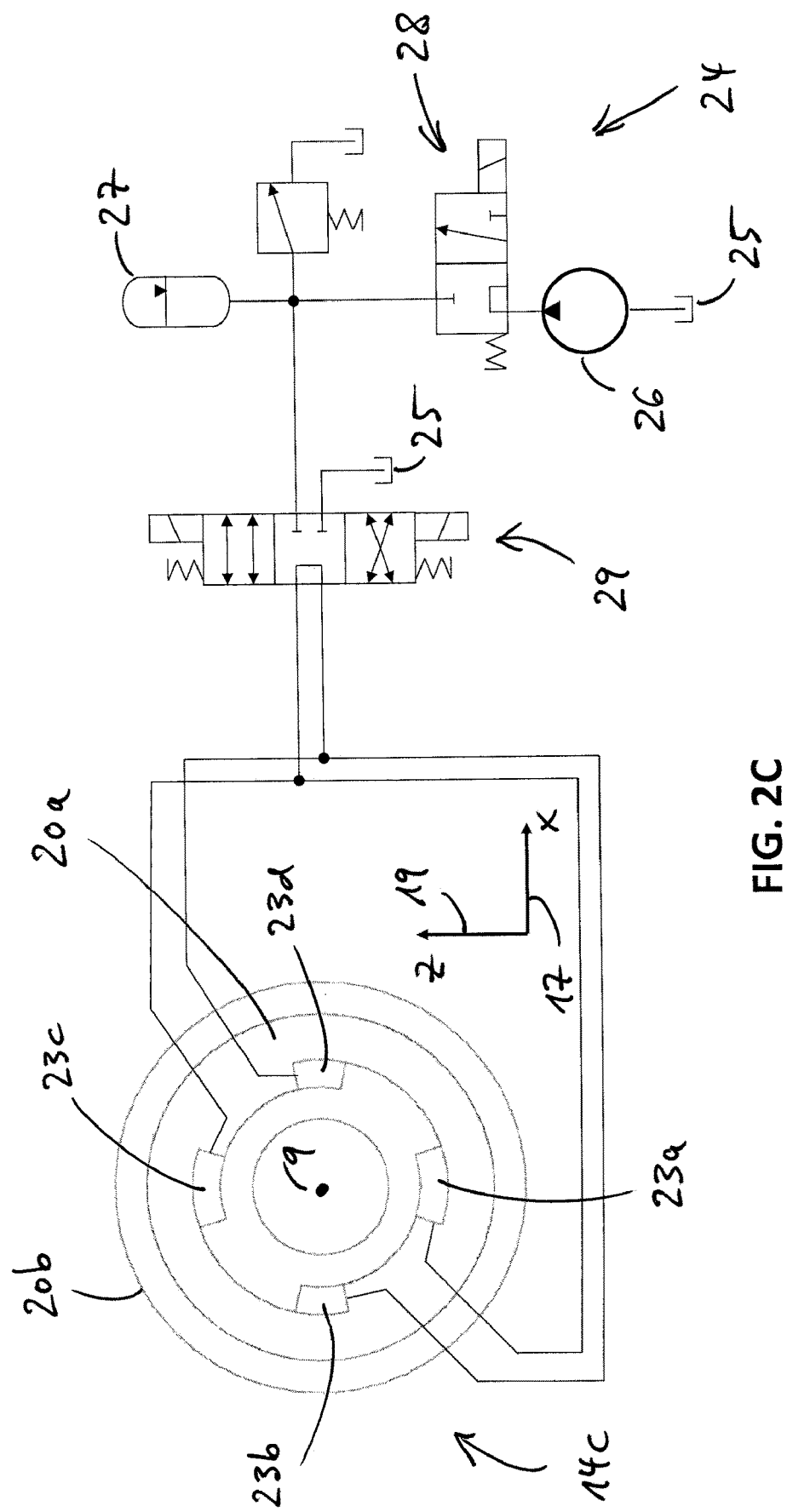
FIG. 2C shows the first sectional view of the rotary actuator of FIG. 2A and a schematic of an embodiment of a hydraulic control circuit for controlling the rotary actuator.

An embodiment of such a hydraulic rotary actuator 14c is depicted in FIGS. 2A-C. Here and in the following, recurring features are designated with the same reference numerals. The relative orientation of the hydraulic rotary actuator 14c of FIGS. 2A-C relative to the other elements of the assembly 1 can be inferred from the orientation of the x-, y-, and z-axis 17, 18, 19 depicted in FIG. 1 and in FIGS. 2A-C. The hydraulic rotary actuator 14c comprises a first annular portion 20a mounted on the link arm 2 and a second annular portion 20b mounted on the bogie 3. It is understood that in other embodiments of the assembly 1, the first annular portion 20a may be mounted on the bogie 3 and the second annular portion 20b may be mounted on the link arm 2. The annular portions 20a, 20b are arranged concentrically with respect to the second swivel axis 9. The second swivel axis 9 forms a common symmetry axis of the first annular portion 20a and of the second annular portion 20b.

The second annular portion 20b defines an annular recess 20c inside which the first annular portion 20a is concentrically received. The second annular portion 20b is pivotally mounted on the first annular portion 20a by means of a bearing 21 depicted in FIG. 2B so that the second annular portion 20b may swivel or pivot with respect to the first annular portion 20a, or vice versa. The second annular portion 20b features a central recess or opening 22 configured to receive the output shaft of the rotary motor 10 (see FIG. 1). In other words, the rotary motor 10 and the hydraulic rotary actuator 14c are configured and arranged such that the output shaft of the rotary motor 10 reaches through the central opening 22 of the second annular portion 20b of the hydraulic rotary actuator 14c.

The first annular portion 20a and the second annular portion 20b feature radial projections 20a' and 20b' which are disposed on an inner side of the first annular portion 20a along a radial direction arranged perpendicular to the second swivel axis 9. The projections 20a', 20b' form mechanical stops that limit the swivelling movement of the second annular portion 20b relative to the first annular portion 20a' in both rotational directions with respect to the second swivel axis 9. The radial projections 20a' of the first annular portion 20a point towards the swivel axis 9, and the radial projections 20b' of the second annular portion 20b point away from the swivel axis 9. It is understood that in alternative embodiments of the hydraulic rotary actuator 14c the radial projections 20a', 20b' may be formed on an outer side of the first annular portion 20a such that the projections 20a' of the first annular portion 20a point away from the swivel axis 9, and the radial projections 20b' of the second annular portion 20b point toward the swivel axis 9.

Actuation chambers 23a-d are formed azimuthally between the radial projections 20a' of the first annular portion 20a and the radial projection 20b' of the second annular portion 20b. A volume of the actuation chambers 23a-d changes as the second annular portion 20b swivels relative to the first annular portion 20a, or vice versa. For example, as the second annular portion 20b rotates clockwise with respect to the first annular portion 20a in FIG. 2A, the volume of the actuation chambers 23a, 23c decreases while, simultaneously, the volume of the actuation chambers 23b, 23d increases. And as the second annular portion 20b rotates counterclockwise with respect to the first annular portion 20a in FIG. 2A, the volume of the actuation chambers 23a, 23c increases while, simultaneously, the volume of the actuation chambers 23b, 23d decreases.

The hydraulic rotary actuator 14c may be actuated by varying an amount of fluid and/or a fluid pressure inside the actuation chambers 23a-d. The fluid may include a liquid such as oil, for example. Specifically, by increasing an amount of fluid and/or a fluid pressure inside the actuation chambers 23b, 23d and by simultaneously draining or at least partially draining the actuation chambers 23a, 23c in FIG. 2B, the second annular portion 20b may be rotated or swivelled in the clockwise direction relative to the first annular portion 20a. And conversely, by increasing an amount of fluid and/or a fluid pressure inside the actuation chambers 23a, 23c and by simultaneously draining or at least partially draining the actuation chambers 23b, 23d in FIG. 2B, the second annular portion 20b may be rotated or swivelled in the counterclockwise direction relative to the first annular portion 20a.

FIG. 2C shows a hydraulic control circuit 24 for actuating the hydraulic rotary actuator 14c. The hydraulic control circuit 24 includes a low pressure fluid tank 25, a fluid pump 26 in fluid communication with the fluid tank 25, a hydraulic accumulator 27, a first control valve 28 configured to selectively fluidly connect the fluid pump 26 with the hydraulic accumulator 27, and a second control valve 29 for selectively fluidly connecting a high pressure side of the fluid pump 26, the accumulator 27 and the fluid tank 25 with the hydraulic rotary actuator 14c, more specifically with the actuation chambers 23a-d of the hydraulic rotary actuator 14c. The second control valve 29 is configured to selectively either one of: fluidly connect the actuation chambers 23a, 23c with the high pressure side of the fluid pump 26, and, simultaneously, fluidly connect the actuation chambers 23b, 23d with the low pressure fluid tank 25; and fluidly connect the actuation chambers 23b, 23d with the high pressure side of the fluid pump 26, and, simultaneously, fluidly connect the actuation chambers 23a, 23c with the low pressure fluid tank 25. When the first and the second swivel control device 11, 14 comprise hydraulic actuators such as the first and the hydraulic cylinder 11a, 14a shown in FIG. 1, the hydraulic control circuit 24 of FIG. 2C may likewise be used to control the first and the second swivel control device 11, 14, for example by means of one or more additional control valves not explicitly depicted in FIG. 2C.

Although not explicitly depicted in FIG. 1, it is understood that in addition or as an alternative to the first hydraulic cylinder 11a, the first swivel control device 11 may likewise comprise a rotary actuator for actively tilting or swivelling the link arm 2 relative to the vehicle frame 5. Said rotary actuator of the first swivel control device 11 may then be of the same type as the rotary actuator 14c of the second swivel control device 14 described above. In other words, the rotary actuator of the first swivel control device 11 may likewise comprise one of an electric rotary actuator, a hydraulic rotary actuator like the one depicted in FIGS. 2A-C, or a pneumatic rotary actuator.

The assembly 1 shown in FIG. 1 further includes a gyrometer or accelerometer 30 fixedly mounted on or configured to be fixedly mounted on the vehicle frame 5, and an electronic control unit (ECU) 31. The gyrometer/accelerometer 30 is configured to measure an attitude of the gyrometer/accelerometer 30 and/or of the vehicle frame 5 on which it is or may be mounted, for example relative to the horizon. The attitude may include one of or both of a pitch angle and a roll angle of the gyrometer/accelerometer 30 and/or of the vehicle frame 5 relative to the horizon. The ECU 31 is in communication with the gyrometer/accelerometer 30 and with one of or both of the first swivel control device 11 and the second swivel control device 14, for example via wired or wireless connections (not shown).

The ECU 31 is configured or programmed to actuate or control one of or both of the first swivel control device 11 and the second swivel control device 14 based on an attitude measured by the gyrometer/accelerometer 30. For example, the ECU may be configured or programmed to control a first swivel angle of the link arm 2 relative to the vehicle frame 5 and/or a second swivel angle of the bogie 3 relative to the link arm 2 based on one or both of a pitch angle and a roll angle of the vehicle frame relative to the horizon. In particular, the ECU 31 may be configured or programmed to control at least one of or both of the first swivel control device 11 and the second swivel control device 14 based on the measured attitude using feedback control. For example, the ECU 31 may be configured or programmed to control the first and/or the second swivel angle such that the vehicle frame 5 maintains a predefined attitude with respect to the horizon, thereby providing improved driveability even in rough terrain.

Figure 3B:
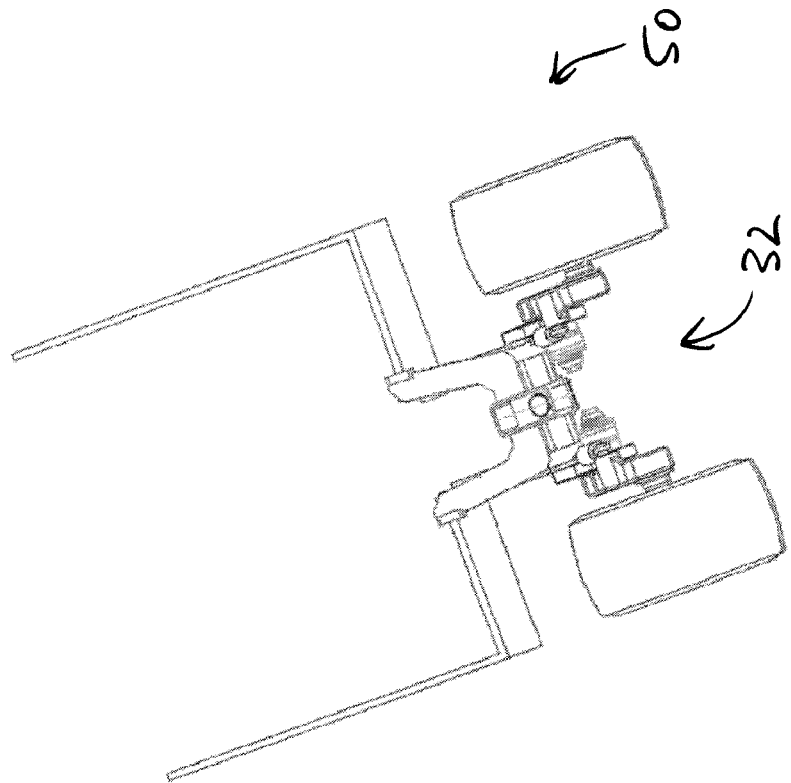
FIG. 3B shows a planar view of a vehicle known from the prior art.
Figure 3A:
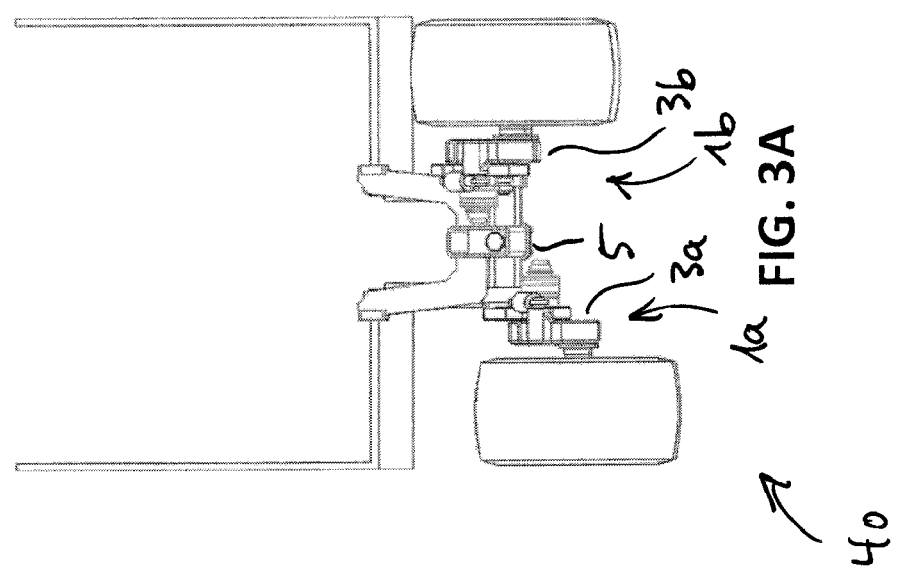
FIG. 3A shows a planar view of an embodiment of a vehicle in accordance with the invention.

FIG. 3A depicts a vehicle 40 of the presently proposed type. The vehicle 40 may be a forestry machine, for example. The vehicle 40 has a vehicle frame 5 and two bogie axle assemblies 1a and 1b mounted on the vehicle frame 5 on opposing lateral sides of the vehicle frame 5, for instance on a front left side and on a front right side of the vehicle frame 5 or on a rear left side and on a rear right side of the vehicle frame 5. The bogie axle assemblies 1a, 1b are both of the same type as the presently proposed bogie axle assembly 1 depicted in FIG. 1 and described in detail above, and comprise bogies 3a and 3b. By contrast, FIG. 3B shows a vehicle 50 known from the prior art and equipped with a known tandem axle 32.

FIGS. 3A and 3B clearly illustrate that in particular in rough terrain the vehicle 40 shown in FIG. 3A provides improved driveability by allowing individual control of the position and/or orientation of the bogies 3a and 3b relative to the vehicle frame 5. In this way, the position and/or orientation of the bogies 3a, 3b may be controlled to keep the vehicle frame 5 in a horizontal or near horizontal orientation at all times even in situations where the vehicle 50 known from the prior art and shown in FIG. 3B features a significant tilt.

Figure 4:
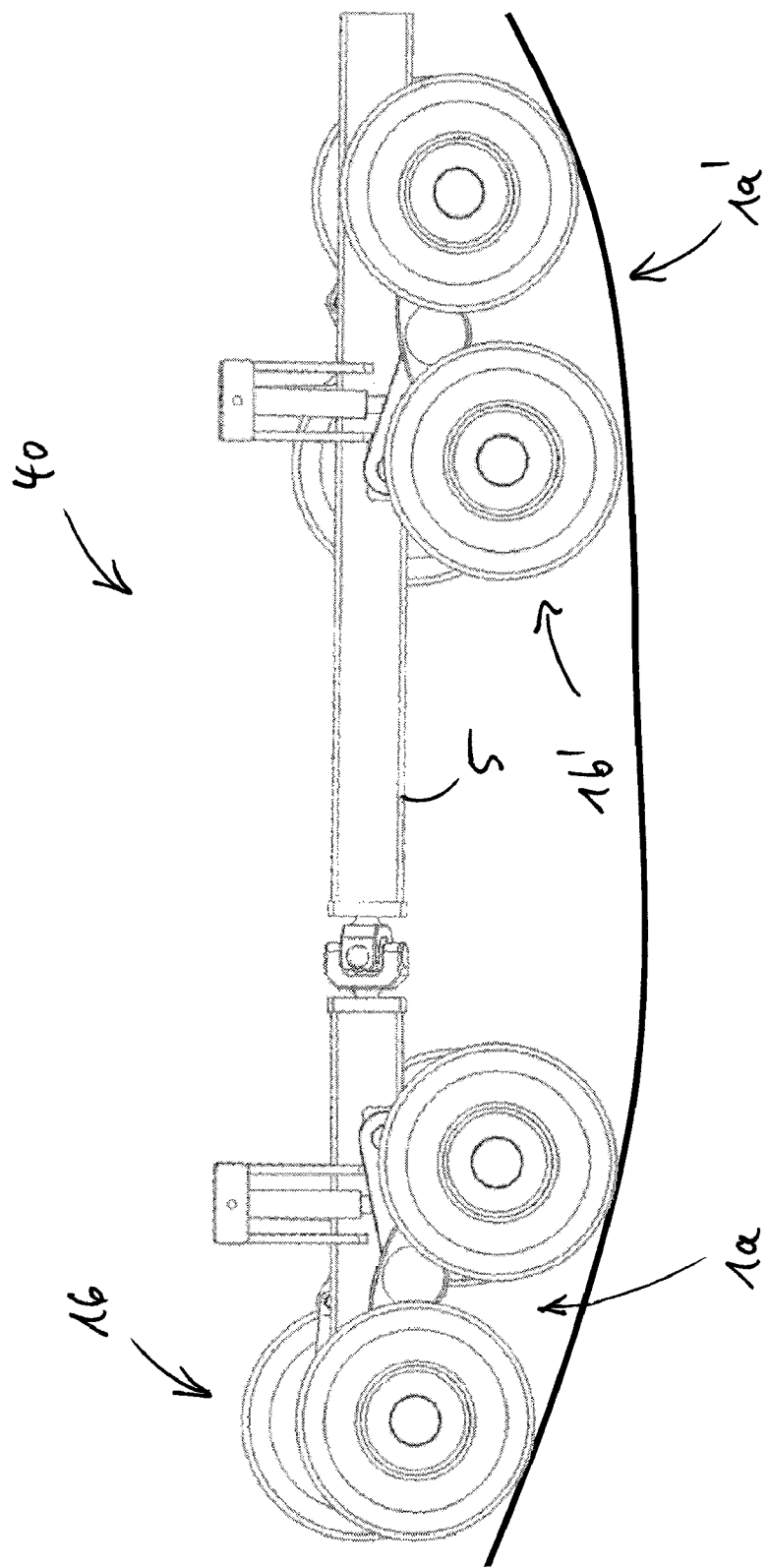
FIG. 4 shows a perspective view of an embodiment of a vehicle in accordance with the invention.

FIG. 4 shows a perspective view of another embodiment of a vehicle 40 featuring a vehicle frame 5 and bogie axle assemblies 1a, 1b, 1a', 1b' of the presently proposed type mounted on the vehicle frame 5, for example on a front left, front right, rear left and rear right side of the vehicle frame 5. Again, FIG. 4 illustrates that even in rough terrain the bogie axle assemblies 1a, 1b, 1a', 1b' of the presently proposed type may be controlled such that the vehicle frame 5 is kept in a horizontal or near horizontal orientation at all times.

The invention claimed is:

1. A bogie axle assembly for a vehicle, the bogie axle assembly comprising:
    a rigid link arm;
    a first joint disposed on the link arm for pivotally coupling the link arm to a vehicle frame;
    a second joint disposed on the link arm, at a distance from the first joint;
    a bogie pivotally coupled to the link arm via the second joint;
    a ground engaging structure comprising one or more wheels rotatably mounted on the bogie;
    a first swivel control device for dampening or for actively controlling a swivelling movement of the link arm with respect to a first swivel axis defined by the first joint; and
    a second swivel control device for dampening or for actively controlling a swivelling movement of the bogie relative to the link arm.

2. The bogie axle assembly of claim 1, wherein the first swivel control device comprises at least one of a first mechanical spring, a first hydraulic cylinder and a first pneumatic cylinder, the first swivel control device pivotally coupled to the link arm via a first link arm pivot point disposed on the link arm at a distance from the first swivel axis.

3. The bogie axle assembly of claim 1, wherein the first swivel control device comprises a first rotary actuator including a first hydraulic rotary actuator, a first pneumatic rotary actuator, or a first electromagnetic rotary actuator.

4. A bogie axle assembly for a vehicle, the bogie axle assembly comprising:
    a rigid link arm;
    a first joint disposed on the link arm for pivotally coupling the link arm to a vehicle frame;
    a second joint disposed on the link arm, at a distance from the first joint;
    a bogie pivotally coupled to the link arm via the second joint;
    a ground engaging structure comprising one or more wheels rotatably mounted on the bogie; and at least one or both of:
    a first swivel control device for dampening or for actively controlling a swivelling movement of the link arm with respect to a first swivel axis defined by the first joint; and
    a second swivel control device for dampening or for actively controlling a swivelling movement of the bogie relative to the link arm, wherein the second swivel control device comprises at least one of a second mechanical spring, a second hydraulic cylinder and a second pneumatic cylinder, the second swivel control device pivotally coupled to the link arm via a second link arm pivot point disposed on the link arm at a distance from the second swivel axis, and the second swivel control device pivotally coupled to the bogie via a bogie pivot point disposed at a distance from the second swivel axis.

5. The bogie axle assembly of claim 1, wherein the second swivel control device comprises a second rotary actuator including a second hydraulic rotary actuator, a second pneumatic rotary actuator, or a second electromagnetic rotary actuator.

6. The bogie axle assembly of claim 3, wherein the first rotary actuator comprises:
    a first portion;
    a second portion pivotally mounted on the first portion; and
    at least one actuation chamber formed between the first portion and the second portion and configured to be pressurized and/or depressurized for swivelling the second portion relative to the first portion by means of a fluid pressure in the at least one actuation chamber.

7. The bogie axle assembly of claim 6, further comprising a fluid pump and one of a hydraulic accumulator and a pneumatic accumulator, wherein the fluid pump and the accumulator are selectively fluidly connected with the at least one actuation chamber.

8. The bogie axle assembly of claim 1, wherein the first joint is configured as a first swivel joint defining a first swivel axis, and wherein the second joint is configured as a second swivel joint defining a second swivel axis, the second swivel axis disposed at a distance from and arranged in parallel to the first swivel axis.

9. The bogie axle assembly of claim 1, further comprising a rotary motor mounted on one of the link arm and the bogie and drivingly engaged with the wheels.

10. The bogie axle assembly of claim 9, wherein the rotary motor comprises at least one of an electric motor and a hydraulic motor.

11. The bogie axle assembly of claim 1, further comprising:
- at least one of a gyrometer and an accelerometer configured to be mounted on a vehicle frame and configured to measure an attitude of the gyrometer and/or of the accelerometer relative to the horizon, the attitude comprising at least one of a roll angle and a pitch angle of the gyrometer and/or of the accelerometer relative to the horizon; and
- an electronic control unit in communication with the gyrometer and/or with the accelerometer and with at least one of or both of the first swivel control device and the second swivel control device, the electronic control unit configured or programmed to control at least one of or both of the first swivel control device and the second swivel control device based on an attitude measured by the gyrometer.

12. A vehicle, comprising:
a vehicle frame;
a first bogie assembly, comprising:
  a first rigid link arm;
  a first joint disposed on the first link arm, the first joint pivotally coupling the first link arm to the vehicle frame;
  a second joint disposed on the first link arm, at a distance from the first joint;
  a first bogie pivotally coupled to the first link arm via the second joint;
  a first ground engaging structure comprising one or more wheels rotatably mounted on the first bogie;
  a first swivel control device for dampening or for actively controlling a swivelling movement of the first link arm relative to the vehicle frame; and
  a second swivel control device for dampening or for actively controlling a swivelling movement of the first bogie relative to the first link arm; and
a second bogie assembly, comprising:
  a second rigid link arm;
  a third joint disposed on the second link arm, the third joint pivotally coupling the second link arm to the vehicle frame;
  a fourth joint disposed on the second link arm, at a distance from the third joint;
  a second bogie pivotally coupled to the second link arm via the fourth joint; and
  a second ground engaging structure comprising one or more wheels rotatably mounted on the second bogie.

13. The vehicle of claim 12, wherein the second bogie assembly further comprises at least one of or both of:
- a third swivel control device for dampening or for actively controlling a swivelling movement of the second link arm relative to the vehicle frame, and
- a fourth swivel control device for dampening or for actively controlling a swivelling movement of the second bogie relative to the second link arm.

14. The bogie axle assembly of claim 5, wherein the second rotary actuator comprises:
a first portion;
a second portion pivotally mounted on the first portion; and
at least one actuation chamber formed between the first portion and the second portion and configured to be pressurized and/or depressurized for swivelling the second portion relative to the first portion by means of a fluid pressure in the at least one actuation chamber.

15. The bogie axle assembly of claim 14, further comprising a fluid pump and one of a hydraulic accumulator and a pneumatic accumulator, wherein the fluid pump and the accumulator are selectively fluidly connected with the at least one actuation chamber.

16. The bogie axle assembly of claim 3, wherein the second swivel control device comprises a second rotary actuator including a second hydraulic rotary actuator, a second pneumatic rotary actuator, or a second electromagnetic rotary actuator.

17. The bogie axle assembly of claim 16, wherein the first hydraulic rotary actuator and/or the second hydraulic rotary actuator and/or the first pneumatic and/or the second pneumatic actuator comprises:
a first portion;
a second portion pivotally mounted on the first portion; and
at least one actuation chamber formed between the first portion and the second portion and configured to be pressurized and/or depressurized for swivelling the second portion relative to the first portion by means of a fluid pressure in the at least one actuation chamber.

18. The bogie axle assembly of claim 17, further comprising a fluid pump and one of a hydraulic accumulator and a pneumatic accumulator, wherein the fluid pump and the accumulator are selectively fluidly connected with the at least one actuation chamber.

* * * * *